US 8,060,813 B2

(12) United States Patent
Yoon et al.

(10) Patent No.: US 8,060,813 B2
(45) Date of Patent: Nov. 15, 2011

(54) APPARATUS AND METHOD FOR GENERATING ERROR DETECTION CODES

(75) Inventors: Sang Sic Yoon, Ichon (KR); Bo Kyeom Kim, Ichon (KR)

(73) Assignee: Hynix Semiconductor Inc. (KR)

( * ) Notice: Subject to any disclaimer, the term of this patent is extended or adjusted under 35 U.S.C. 154(b) by 1001 days.

(21) Appl. No.: 11/958,324

(22) Filed: Dec. 17, 2007

(65) Prior Publication Data

US 2009/0019344 A1   Jan. 15, 2009

(30) Foreign Application Priority Data

Jul. 12, 2007   (KR) .................. 10-2007-0070192

(51) Int. Cl.
*G06F 11/10* (2006.01)
(52) U.S. Cl. ...................................... 714/807
(58) Field of Classification Search ............... 714/807
See application file for complete search history.

(56) References Cited

U.S. PATENT DOCUMENTS

| 6,324,669 | B1 | 11/2001 | Westby |
| 6,584,526 | B1* | 6/2003 | Bogin et al. ............... 710/124 |
| 6,594,244 | B1 | 7/2003 | Chang et al. |
| 6,633,999 | B1 | 10/2003 | Lee |
| 7,139,852 | B2 | 11/2006 | LaBerge |
| 7,174,498 | B2 | 2/2007 | Weissinger |
| 2003/0066005 | A1* | 4/2003 | Iglesia et al. ............ 714/752 |
| 2005/0289435 | A1* | 12/2005 | Mulla et al. ............. 714/758 |
| 2007/0115733 | A1 | 5/2007 | Jang et al. |
| 2008/0082900 | A1* | 4/2008 | Yoon .......................... 714/768 |

FOREIGN PATENT DOCUMENTS

| JP | 06003420 | 1/1994 |
| JP | 09204365 | 8/1997 |
| JP | 2005-006298 | 6/2005 |
| KR | 101998047257 | 9/1998 |

OTHER PUBLICATIONS

A.K. Nieuwland, et al. "Coding Techniques for Low Switching Noise in Fault Tolerant Busses" (Proceedings of the 11th IEEE International On-Line Testing Symposium (IOLTS'05, 2005.).

* cited by examiner

*Primary Examiner* — Scott Baderman
*Assistant Examiner* — Justin Knapp
(74) *Attorney, Agent, or Firm* — Baker & McKenzie LLP (57) ABSTRACT

An apparatus for generating error detection codes can include an error detection code generation unit configured to generate virtual error detection codes using virtual DBI information and data, and an error detection code regeneration unit configured to generate error detection codes using even and odd number information which define whether the number of data associated with the generation of the error detection codes is even or odd, DBI information associated with the even and odd number information, and the virtual error detection codes.

20 Claims, 5 Drawing Sheets

APPARATUS AND METHOD FOR GENERATING ERROR DETECTION CODES

CROSS-REFERENCE TO RELATED PATENT APPLICATION

This application claims the benefit under 35 U.S.C. 119(a) of Korean Patent Application No. 10-2007-0070192, filed on Jul. 12, 2007, in the Korean Intellectual Property Office, the disclosure of which is incorporated herein in its entirety by reference.

BACKGROUND

1. Technical Field

The disclosure herein relates to a semiconductor integrated circuit, and more particularly, to an apparatus and a method for generating error detection codes.

2. Related Art

A configuration for implementing a data bus inversion function, that is, a data bus inversion (DBI) unit is used to prevent a problem, such as simultaneous switching noise or inter-symbol interference, that is caused as the number of current data bits in entire data bits, of which logic values are changed when compared to previous data bits, increases in data transmission.

When the number of data bits with changed logic values are greater than one half of the entire number of data bits, the data bus inversion unit enables DBI flags such that inverted data is transmitted instead of normal data to decrease the number of the data bits to be switched to less than one half of the number of the entire data bits.

In the case of a semiconductor circuit as processing speed increases, the probability of an error to occur in data transmission increases. One example of this is in a semiconductor memory device such as a DRAM. Accordingly, an error detection code generation circuit can be used to generate and transmit error detection codes separately from data so that a data reception side can determine whether an error occurs in received data.

Conventional error detection code generation circuits have adopted CRC (cyclic redundancy check) logic, such as CRC8, in which error detection codes of 8 bits are output from 64 bits.

In a semiconductor circuit having a conventional data bus inversion unit, the configuration of an apparatus for generating error detection codes will be described below.

Figure 1:
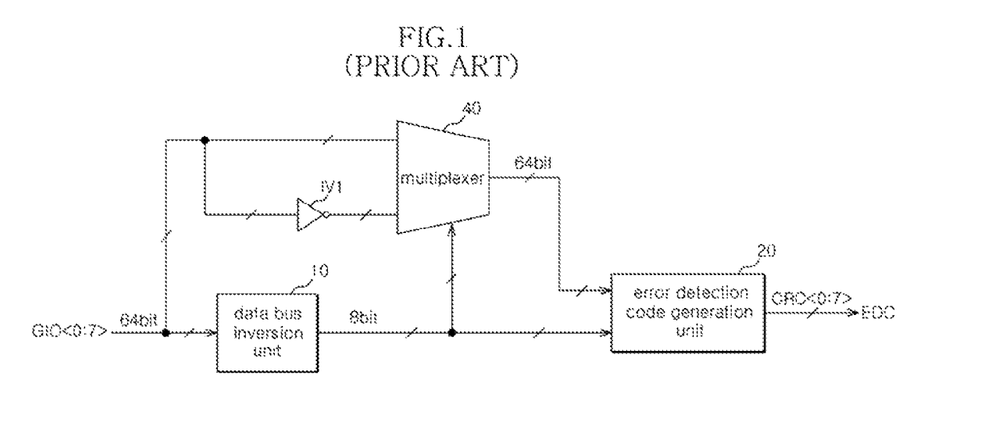
FIG. 1 is a block diagram illustrating a conventional apparatus for generating error detection codes.

Referring to FIG. 1, a conventional apparatus configured to generate error detection codes includes a data bus inversion unit 10, an error detection code generation unit 20, an inverter IV1, and a multiplexer 40.

The data bus inversion unit 10 is configured to receive 64-bit data through data lines (GIO<0:7>) and generate 8-bit DBI flags.

The inverter IV1 is configured to invert and output the 64-bit data.

The multiplexer 40 is configured to selectively output the 64-bit data or 64-bit data inverted by the inverter IV1, in response to the DBI flags.

The operations of the conventional apparatus for generating error detection codes will be described below.

The data bus inversion unit 10 receives the 64-bit data and checks the number of data bits of which logic values are changed in every 8 bits when compared to previous data bits.

When the number of data bits in the entire data bits, of which logic values are changed, is greater than one half of the entire data bits, the data bus inversion unit 10 outputs the DBI flags to a low level.

When the DBI flags have a low level, the multiplexer 40 selects and outputs the data inverted through the inverter IV1.

The error detection code generation unit 20 generates and outputs error detection codes (CRC<0:7>) for the 64-bit data output from the multiplexer 40 and the 8-bit DBI flags.

The error detection code generation unit 20 generates the error detection codes (CRC<0:7>) by XORing the entire 64-bit data and 8-bit DBI flags, that is, 72 bits, in accordance with a CRC (cyclic redundancy check) logic.

The error detection codes (CRC<0:7>) are output through an EDC (error detection code) pin to an external system, for example, a GPU (graphic processing unit).

In the semiconductor circuit having the above-described data bus inversion unit 10, the 8-bit DBI flags are required to generate the error detection codes.

Therefore, in a conventional circuit, since an operation process for the generation of the error detection codes can be implemented after implementing an operation process for the data bus inversion function, a problem can occur due to that the fact that the time for generating the error detection codes is extended. This can degrade the performance of a system such as a semiconductor memory device.

SUMMARY

A method for generating error detection codes, which can shorten the time required for generation of error detection codes, is described herein.

One aspect can include an apparatus configured to generate error detection codes comprising an error detection code generation unit configured to generate virtual error detection codes using virtual DBI information and data; and an error detection code regeneration unit configured to generate error detection codes using even and odd number information which define whether the numbers of data associated with generation of the error detection codes are even or odd, DBI information associated with the even and odd number information, and the virtual error detection codes.

Another aspect can include an apparatus configured to generate error detection codes, comprising a data bus inversion unit configured to generate DBI information using data; an error detection code generation unit configured to generate virtual error detection codes before the DBI information is completely generated, using virtual DBI information and the data; and an error detection code regeneration unit configured to generate error detection codes using even and odd number information which define whether the number of data associated with the generation of the error detection codes are even or odd, DBI information associated with the even and odd number information, and the virtual error detection codes.

Still another aspect includes a method of generating error detection codes, comprising the steps of generating even and odd number information for the number of data, which are associated with generation of error detection codes, among entire data; generating virtual error detection codes before DBI information is completely generated, using virtual DBI information and the data; and generating error detection codes using the even and odd number information, DBI information, which is associated with the even and odd number information, among the entire DBI information, and the virtual error detection codes.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 2:
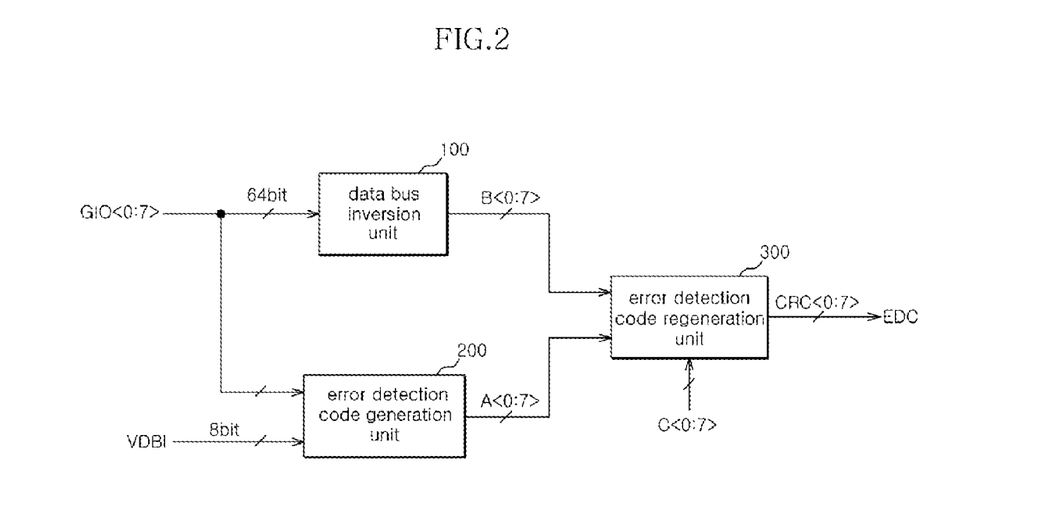
FIG. 2 is a block diagram illustrating an apparatus configured to generate error detection codes in accordance with one embodiment.

FIG. 2 is a block diagram illustrating an apparatus configured to generate error detection codes in accordance with one embodiment. Referring to FIG. 2, the apparatus configured to generate error detection codes in accordance with one embodiment, in which DBI flags for a data bus inversion function should be included in an operation process for the generation of error detection codes, can include a semiconductor integrated circuit provided with a data bus inversion unit 100 for performing the data bus inversion function, an error detection code generation unit 200 and an error detection code regeneration unit 300.

The error detection code generation unit 200 can be configured to generate virtual error detection codes (A<0:7>) using 64-bit data input through data lines (GIO<0:7>) and 8-bit virtual DBI flags (VDBI). The virtual DBI flags (VDBI) can be set to the values of DBI flags that are used when 64-bit data is output without one bit inverted. In the case where the DBI flags have a high level, since the data is not inverted, all of the 8-bit virtual DBI flags (VDBI) can be set to a high level, that is, 11111111.

The error detection code generation unit 200 can be configured, in the circuit thereof, using a CRC (cyclic redundancy check) logic, and can have the same configuration as the error detection code generation unit 20 shown in FIG. 1.

The error detection code regeneration unit 300 can be configured to generate error detection codes (CRC<0:7>) using the virtual error detection codes (A<0:7>), DBI flags (B<0:7>) sent from the data bus inversion unit 100, and even and odd number information (C<0:7>). The even and odd number information (C<0:7>) can define whether the number of the data among the 8-bit data sequentially input through respective data lines (GIO<0:7>), which are associated with the generation of the error detection codes, is even or odd. The even and odd number information (C<0:7>) can be 64 bits with 8 bits allocated for each of (C<0>) through (C<7>).

Figure 3:
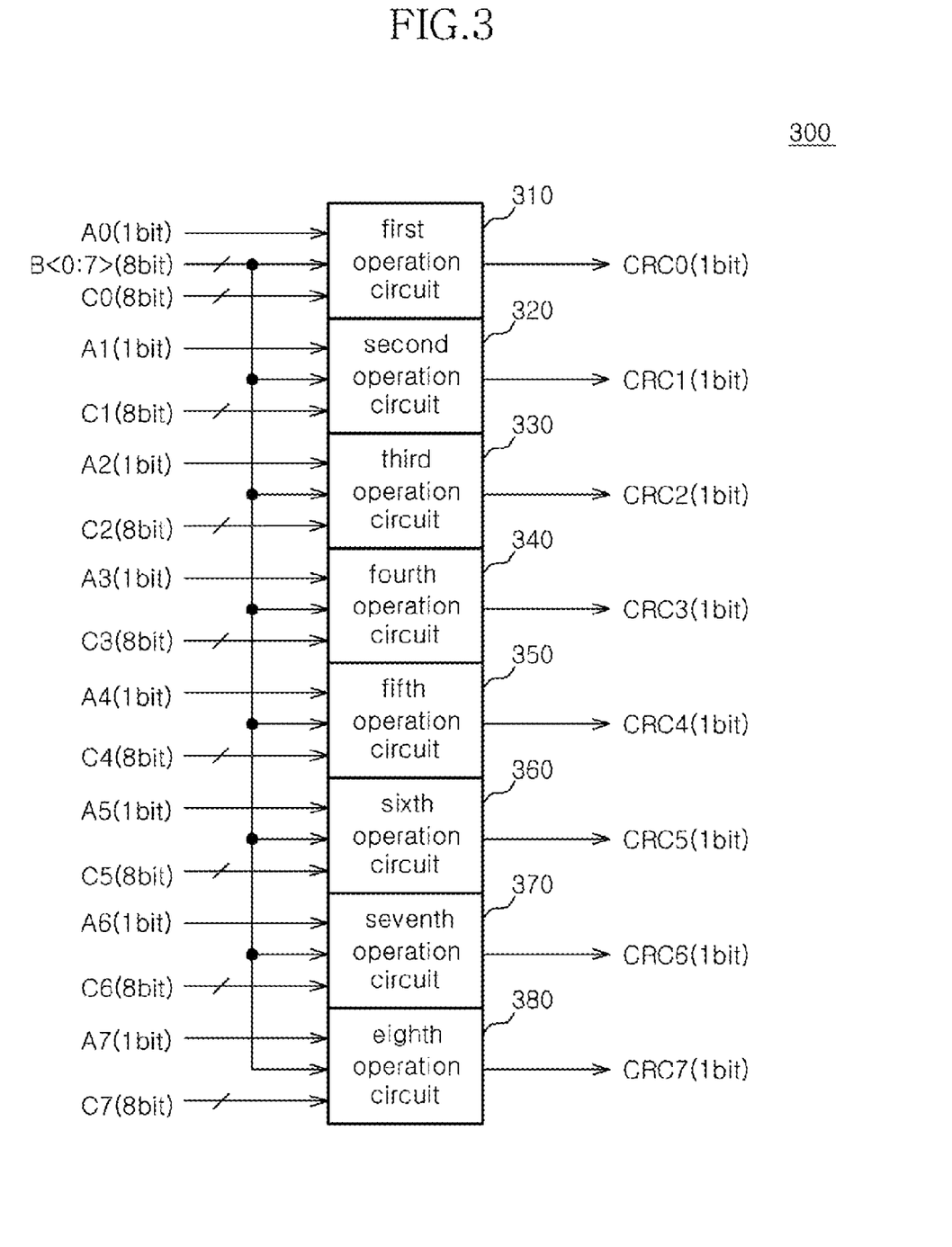
FIG. 3 is a block diagram illustrating an error detection code regeneration unit that can be included in the circuit illustrated in FIG. 2.

FIG. 3 is a block diagram illustrating an error detection code regeneration unit 300 that can be included in the circuit illustrated in FIG. 2. Referring to FIG. 3, the error detection code regeneration unit 300 can include first through eighth operation circuits 310 through 380, for selectively receiving the virtual error detection codes (A<0:7>), the DBI flags (B<0:7>) and even and odd number information (C<0:7>), and generate the respective bits of the 8-bit error detection codes (CRC<0:7>).

$$CRC0 = Z00 \oplus Z01 \oplus Z02 \oplus Z03 \oplus Z04 \oplus Z05 \oplus Z06 \oplus Z07$$

$$= A00 \oplus (/B0 \times C00) \oplus A01 \oplus$$

$$(/B1 \times C01) \oplus$$

$$A02 \oplus (/B2 \times C02) \oplus A03 \oplus$$

$$(/B3 \times C03) \oplus$$

$$A04 \oplus (/B4 \times C04) \oplus A05 \oplus$$

$$(/B5 \times C05) \oplus$$

$$A06 \oplus (/B6 \times C06) \oplus A07 \oplus$$

$$(/B7 \times C07)$$

[Mathematical Expression 1]

Mathematical Expression 1 can define the relationship of the error detection code (CRC0) with the virtual error detection codes (A<0:7>), the DBI flags (B<0:7>) and the even and odd number information (C<0:7>).

As defined in Mathematical Expression 1, it is to be appreciated that the error detection code (CRC0) can be generated by ANDing each of the DBI flags (B<0:7>) and each bit of the even and odd number information (C0) ('C00' through 'C07') associated with the error detection code (CRC0) and then XORing the ANDing result values and the virtual error detection code (A0).

Figure 4:
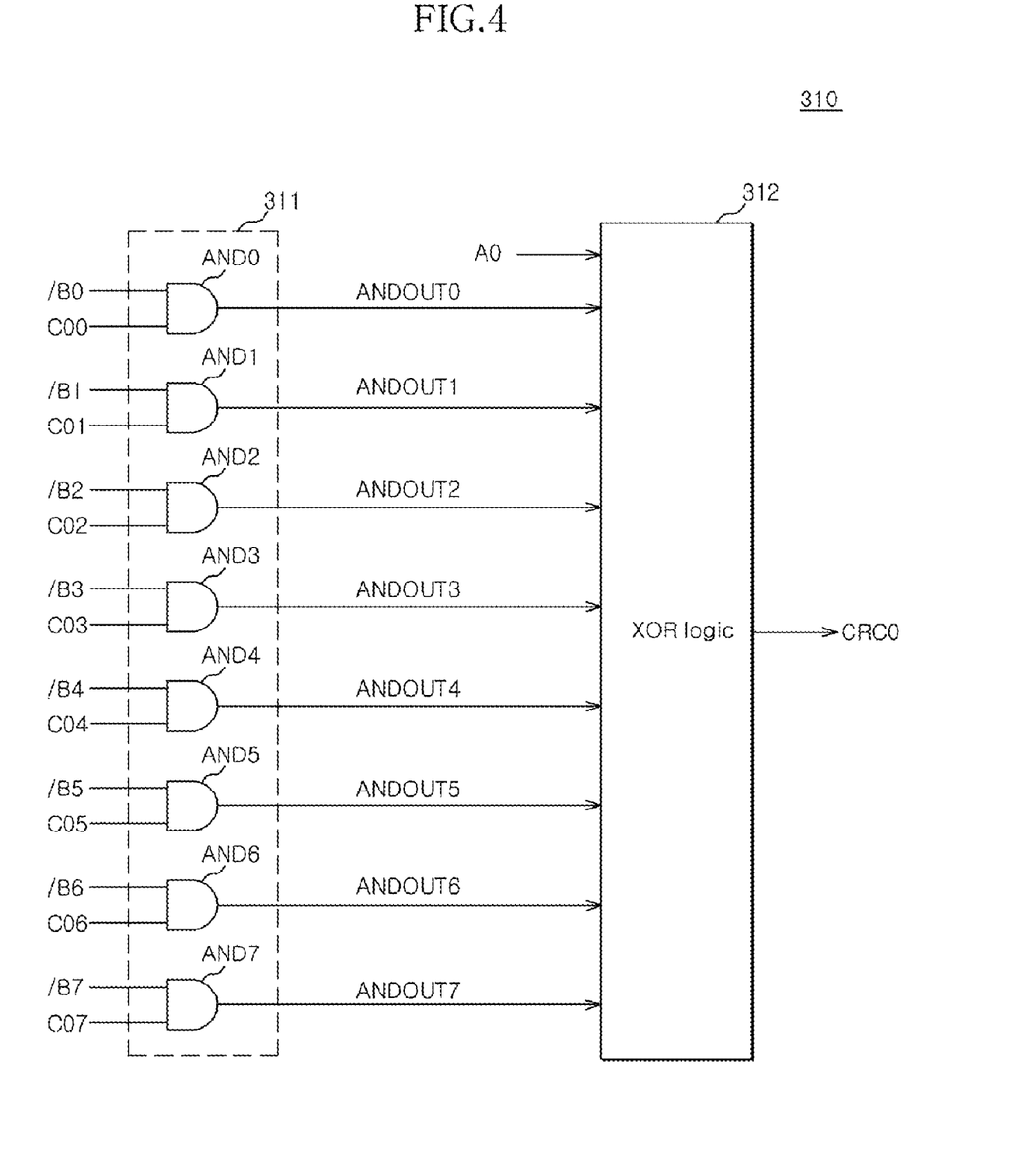
FIG. 4 is a circuit diagram illustrating a first operation circuit that can be included in the circuit illustrated in FIG. 3.
Figure 5:
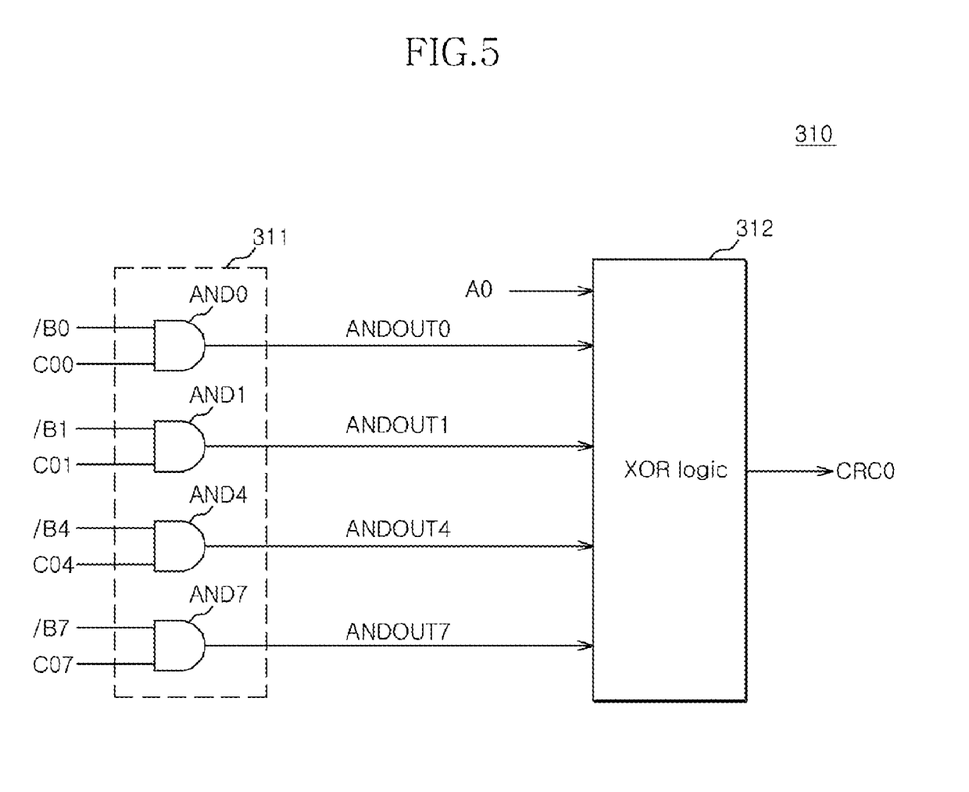
FIG. 5 is a circuit diagram illustrating an embodiment of a first operation circuit that can be included in the circuit illustrated in FIG. 3.

FIG. 4 and FIG. 5 are circuit diagrams illustrating operation circuits that can be included in the circuit illustrated in FIG. 3. Referring to FIG. 4, the first operation circuit 310 can be conceptually configured in accordance with the definition of Mathematical Expression 1 and include an AND logic 311 and an XOR logic 312. The AND logic 311 can have eight AND gates AND0 through AND7.

TABLE 1

|  | 1st data | 2nd data | 3rd data | 4th data | 5th data | 6th data | 7th data | 8th data |
|---|---|---|---|---|---|---|---|---|
| GIO 0 | 0 |  |  |  |  |  | 6 | 7 |
| GIO 1 | 8 |  |  |  | 12 |  | 14 |  |
| GIO 2 | 16 |  | 18 | 19 |  | 21 |  | 23 |
| GIO 3 |  |  |  |  | 28 |  | 30 | 31 |
| GIO 4 |  |  | 34 | 35 |  |  |  | 39 |
| GIO 5 | 40 |  |  | 43 |  | 45 |  |  |
| GIO 6 | 48 | 49 | 50 |  | 52 | 53 | 54 |  |
| GIO 7 | 56 |  |  |  | 60 |  |  | 63 |
| B<0:7> | 64 |  | 66 | 67 | 68 | 69 |  |  |
| A0 | A00 | A01 | A02 | A03 | A04 | A05 | A06 | A07 |
| B<0:7> | B0 | B1 | B2 | B3 | B4 | B5 | B6 | B7 |
| C0 | C00 | C01 | C02 | C03 | C04 | C05 | C06 | C07 |
| CRC 0 | Z00 | Z01 | Z02 | Z03 | Z04 | Z05 | Z06 | Z07 |

Referring to Table 1, when using an operation principle according to the CRC logic, the sequential data '1st data' through '8th data', which is sequentially input from first to eighth through the data lines (GIO<0:7>) and the DBI flags (B<0:7>), are classified into data that can exert influence on the value of the error detection code (CRC0) and data which does not exert influence on the value of the error detection code (CRC0) when generating the error detection code (CRC0).

Among the data given in Table 1, the data provided with numbers are data that can exert influence on the value of the error detection code (CRC0) when generating the error detection code (CRC0). Among the data given in Table 1, the data not provided with numbers are data that are not associated with the generation of the error detection code (CRC0).

The data associated with the remaining error detection codes (CRC1) through (CRC7) can also be extracted using the operation principle according to the CRC logic and can be different from those given in Table 1.

The virtual error detection code (A0) can have eight signal components (A00) through (A07), which are respectively assigned to the sequential data '1st data' through '8th data' and which can be sequentially input from first to eighth.

The eight signal components (A00) through (A07) are the values that can be obtained by XORing the data provided with the numbers in the respective sequential data '1st data' through '8th data'. For example, the signal component (A02) can be the value that is obtained by XORing data<18>, data<34>, data<50> and data<66> in the third data '3rd data'.

The virtual error detection code (A0) can be the value that can be obtained by XORing all the eight signal components (A00) through (A07).

The even and odd number information (C0) is the information that can define whether the numbers of data, which can exert influence on the value of the error detection code (CRC0), are even or odd in the respective sequential data '1st data' through '8th data,' which can be sequentially input from first to eighth by 8 bits. The even and odd number information (C0) can have eight signal components 'C00' through 'C07', which can be respectively assigned to the sequential data '1st data' through '8th data' and which can be sequentially input from first to eighth.

Referring to Table 1, in the sequential data '1st data' through '8th data', which can be sequentially input and the DBI flags (B<0:7>), the number of the data that can exert influence on the value of the error detection code (CRC0), and the number of the data that do not exert influence on the value of the error detection code (CRC0) when generating the error detection code (CRC0) are not changed as being extracted using an operation principle according to the CRC logic. Therefore, the even and odd number information (C0) and the values of the signal components 'C00' through 'C07' thereof are also not changed.

When the number of input data is even, if the number of the data having a high level is odd, then the number of the data having a low level is also odd. Thus, even when all the input data are inverted, the value of the error detection code (CRC0) is not changed.

Even though the even and odd number information (C0) (for example, 'C00') has a high level, that is, the number of the data is odd, if the DBI flag (for example, 'B<0>') has a high level, then no influence is exerted on the value of the virtual error detection code (A0). This is because the virtual error detection code (A0) is generated with the virtual DBI flags (VDBI) set to a high level.

Whether the number of the data, which is associated with the generation of the error detection code (CRC0), is even or odd can be determined from the even and odd number information 'C00' through 'C07'. If the number of the data, which is associated with the generation of the error detection code (CRC0), is even, then the even and odd number information 'C00' through 'C07' can have a low level.

The first operation circuit 310 shown in FIG. 4 can have a conceptual configuration according to Mathematical Expression 1.

Actually, when configuring the first operation circuit 310 based on Table 1, by removing the AND gates AND2, AND3, AND5 and AND6, which are input with even and odd number information 'C02', 'C03', 'C05' and 'C06' having a low level, from the even and odd number information 'C00' through 'C07', the area of a circuit can be decreased as shown in FIG. 5. This is because the resultant value of the ANDing operation is always a low level when one of input signals has a low level, and hence it is not necessary to provide corresponding AND circuits.

Since influence can be exerted on the value of the virtual error detection code (A0) only when the DBI flags (B<0:7>) have a low level, the values obtained by inverting the DBI flags (B<0:7>) are input to the AND logic 311 in place of the original DBI flags (B<0:7>).

The second through eighth operation circuits 320 through 380 can be configured using the same principle as the first operation circuit 310.

A second method of generating error detection codes according to another embodiment entails the data bus inversion unit 100 can be configured to receive 64-bit data and check the number of bits of which logic values are changed in every 8 bits when compared to previous data, and output DBI flags (B<0:7>), which can correspond to the check results.

The error detection code generation unit 200 can generate and output the virtual error detection codes (A<0:7>) for the 64-bit data and the virtual DBI flags (VDBI).

The generation of the virtual error detection codes (A<0:7>) by the error detection code generation unit 200 can be implemented independently of the data bus inversion unit 100. The virtual error detection codes (A<0:7>) can be generated faster than or at the same time with the DBI flags (B<0:7>).

The first through eighth operation circuits 310 through 380 of the error detection code regeneration unit 300 can simultaneously implement operations for some bits of the 64-bit data, which are associated with the generation of the error detection codes (CRC<0:7>), and some bits of the 8-bit DBI flags (B<0:7>), and generate the error detection codes (CRC<0:7>).

In a conventional circuit shown in FIG. 1, the error detection code generation unit 20 implements an operation for the entire 64-bit data and 8-bit DBI flags, that is, 72 bits and generates the error detection codes (CRC0).

However, when based on Table 1, the first operation circuit 310 shown in FIG. 4 can implement an operation for 29 bits among the 64-bit data, which can be associated with the generation of the error detection codes (CRC<0:7>), and 5 bits among the 8-bit DBI flags (B<0:7>), that is, 34 bits and generate the error detection code (CRC<0>).

Also, in the case of the second through eighth operation circuits 320 through 380, they can implement an operation for some of the data which is a decrease when compared to a conventional circuit and some of the DBI flags (B<0:7>), which can be decreased when compared to the conventional circuit and generate the error detection codes (CRC<1:7>).

For example, in a conventional circuit, e.g., as shown in FIG. 1, assuming that the operation time of the data bus inversion unit 10 is '10' and the operation time of the error detection code generation unit 20 is '20', the total time required for the generation of the error detection codes (CRC<0:7>) is '30'.

However, in the embodiments described herein, e.g., as shown in FIG. 2, the operation time of the data bus inversion unit 100 is '10'. However, since the error detection code generation unit 200 completes the operation earlier than the data bus inversion unit 100, no time is added. Further, because the error detection code regeneration unit 300 operates on one half the data relative to conventional circuits, the required operation time can be approximately '10'. As a consequence, the total operation time required for generating the error detection codes (CRC<0:7>) can be less than '20'.

A reduction of time in this level can serve as a factor that can significantly influence performance in a system such as a semiconductor memory device operating at a high speed.

The error detection codes (CRC<0:7>) can be output through an EDC (error detection code) pin to an external system, for example, a GPU (graphic processing unit).

As is apparent from the above description, the apparatus and method of generating error detection codes according to the present embodiments allow the generation of error detection codes that is primarily implemented using a virtual DBI flag for an operation time for performing a data bus inversion function, and the operation of generating error detection codes can be secondarily and finally implemented using only some signal components among the signal components necessary for conventional operation for generating error detection codes, which are usually associated with the generation of error detection codes. Accordingly, the time required for the generation of error detection codes can be significantly decreased. Due to this fact, the performance of a system using the present apparatus, for example, a semiconductor memory device such as a dynamic random access memory (DRAM), can be improved.

While certain embodiments have been described above, it will be understood that the embodiments described are by way of example only. Accordingly, the apparatus and methods described herein should not be limited based on the described embodiments. Rather, the apparatus and methods described herein should only be limited in light of the claims that follow when taken in conjunction with the above description and accompanying drawings.

What is claimed is:

1. An apparatus configured to generate error detection codes, comprising:
   an error detection code generation unit configured to generate virtual error detection codes using virtual data bus inversion (DBI) information and data; and
   an error detection code regeneration unit coupled to the error detection code generation unit, the error detection code regeneration unit configured to generate error detection codes using even and odd number information, which define whether the number of data associated with generation of the error detection codes is even or odd, DBI information associated with the even and odd number information, and the virtual error detection codes.

2. The apparatus according to claim 1, wherein the virtual DBI information is set to values of the DBI information when the data is output without one bit inverted.

3. The apparatus according to claim 1, wherein the error detection code regeneration unit is further configured such that the even and odd number information is used as a factor capable of changing values of the error detection codes.

4. The apparatus according to claim 3, wherein the even and odd number information define that the number of data associated with the generation of the error detection codes is odd.

5. The apparatus according to claim 1, wherein the error detection code generation unit comprises CRC (cyclic redundancy check) logic.

6. The apparatus according to claim 1, wherein the error detection code regeneration unit comprises a plurality of operation circuits configured to selectively receive the even and odd number information and the virtual error detection codes and commonly receive the DBI information associated with the even and odd number information.

7. The apparatus according to claim 6, wherein the operation circuit comprises AND logic configured to AND each bit of the even and odd number information and each bit of the DBI information associated with the even and odd number information, and XOR logic configured to XOR outputs of the AND logic and the virtual error detection code.

8. An apparatus for generating error detection codes, comprising:
   a data bus inversion unit configured to generate DBI information using data;
   an error detection code generation unit coupled to the data bus inversion unit configured to generate virtual error detection codes before the DBI information is completely generated, using virtual DBI information, and the data; and
   an error detection code regeneration unit coupled to the error detection code regeneration unit, the error detection code regeneration unit configured to generate error detection codes using even and odd number information, which define whether the number of data which are associated with generation of the error detection codes is even or odd, DBI information associated with the even and odd number information, and the virtual error detection codes.

9. The apparatus according to claim 8, wherein the virtual DBI information is set to values of the DBI information when the data is output without one bit inverted.

10. The apparatus according to claim 8, wherein the error detection code regeneration unit is further configured such that the even and odd number information is a factor capable of changing values of the error detection codes.

11. The apparatus according to claim 10, wherein the even and odd number information is information having values, which define that the number of data associated with the generation of the error detection codes is odd.

12. The apparatus according to claim 8, wherein the error detection code generation unit comprises CRC (cyclic redundancy check) logic.

13. The apparatus according to claim 8, wherein the error detection code regeneration unit comprises a plurality of operation circuits that can be configured to selectively receive the even and odd number information and the virtual error detection codes and commonly receive the DBI information associated with the even and odd number information.

14. The apparatus according to claim 13, wherein the operation circuit comprises AND logic configured to AND each bit of the even and odd number information and each bit of the DBI information associated with the even and odd number information, and XOR logic configured to XOR outputs of the AND logic and the virtual error detection code.

15. A method for generating error detection codes, comprising the steps of:
    generating even and odd number information for the number of data associated with generation of error detection codes, among entire data;
    generating virtual error detection codes before DBI information is completely generated, using virtual DBI information and the data; and
    generating error detection codes using the even and odd number information, DBI information associated with the even and odd number information among the entire DBI information, and the virtual error detection codes.

16. The method according to claim 15, wherein the virtual DBI information is set to the value of the DBI information when the data is output without one bit inverted.

17. The method according to claim 15, wherein the even and odd number information is used as a factor capable of changing values of the error detection codes.

18. The method according to claim 17, wherein the even and odd number information defines that the number of data associated with the generation of the error detection codes is odd.

19. The method according to claim 15, wherein the virtual error detection codes are generated in accordance with CRC (cyclic redundancy check) logic.

20. The method according to claim 15, wherein the step of generating the error detection codes comprises the steps of:
   ANDing each bit of the even and odd number information and each bit of the DBI information associated with the even and odd number information, among the entire DBI information; and
   XORing the ANDing results and the virtual error detection code and outputting the XORing results as the error detection codes.

* * * * *